United States Patent [19]

Stewart

[11] 3,829,979
[45] Aug. 20, 1974

[54] VALVE CLEARANCE MEASURING APPARATUS

[76] Inventor: Douglas John Stewart, 57a Wharf St., Sowerby Bridge, England

[22] Filed: June 7, 1973

[21] Appl. No.: 368,207

[30] Foreign Application Priority Data
June 9, 1972 Great Britain.................. 26924/72

[52] U.S. Cl............................ 33/180 AT, 33/169 B
[51] Int. Cl........................... G01b 5/18, G01b 3/52
[58] Field of Search..... 33/180 AT, 181 AT, 180 B, 33/169 B, 169 R, 172 R, 172 B, 170, 171

[56] References Cited
UNITED STATES PATENTS

| | | | |
|---|---|---|---|
| 2,104,234 | 1/1938 | Linne | 33/181 AT |
| 2,155,562 | 4/1939 | Price | 33/170 |
| 2,827,710 | 3/1958 | Campbell | 33/180 AT |
| 2,851,782 | 9/1958 | Kollmann | 33/172 R |
| 3,046,665 | 7/1962 | Nilsson | 33/172 R |
| 3,273,249 | 9/1966 | Klaassen | 33/172 A |

Primary Examiner—Harry N. Haroian
Assistant Examiner—John W. Shepperd
Attorney, Agent, or Firm—Norris & Bateman

[57] ABSTRACT

Apparatus for measuring the valve clearance and thus the size of shim disc required in an overhead camshaft internal combustion engine prior to insertion of the cam-shaft thereon, in which an elongate cylindrical member is mounted in the cam-shaft bearings on the cylinder head of the engine. The elongate member has a diametrical hole formed therein which is aligned with one valve stem. A block having a bore in which a dial indicator is secured, is positioned on the cylindrical member with the bore aligned with the diametrical hole so that the dial indicator rod extends therethrough to contact the end face of the valve stem and the dial indicator measures the distance between said end face and a predetermined datum-line or datum surface corresponding to the heel portion of a cam on the cam-shaft.

11 Claims, 4 Drawing Figures

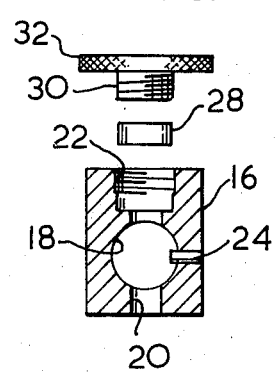
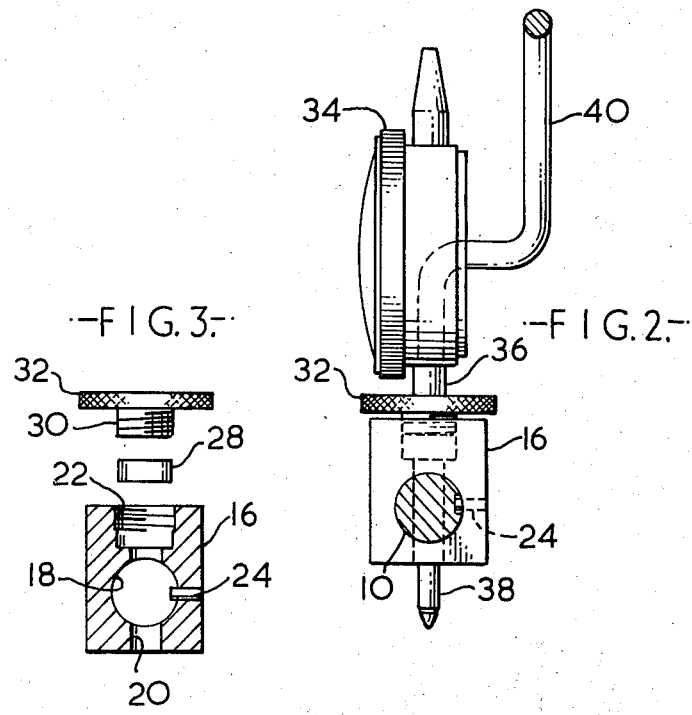
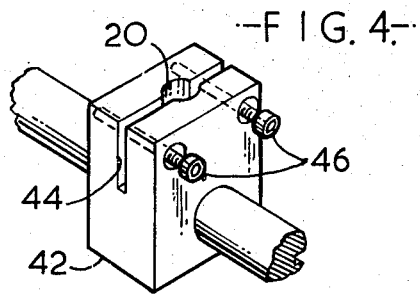

VALVE CLEARANCE MEASURING APPARATUS

This invention relates to valve clearance measuring apparatus and more particularly to apparatus for measuring the valve clearance on an overhead cam-shaft internal combustion engine.

An internal combustion engine, having an overhead cam-shaft with cams formed thereon for operating the engine's inlet and exhaust valves, is usually provided with shim discs which are located between the end of the stem of each inlet or exhaust valve and the associated cam on the cam-shaft. Although the major components of the engine are normally manufactured to close tolerances, it is necessary to grind the valves and the valve seats in the engine's cylinder head, in conventional manner, until a good seal is obtained between each valve and the associated valve seat. This individual grinding-in process of each valve and the associated valve seat causes variation in the distances between the end of the stem of each valve and the associated cam, both during manufacture and also during subsequent servicing of the engine. In order that the valve clearance for each valve may be set to the desired value, the distance between the end of each inlet or exhaust valve stem and the heel of the associated cam is measured and a shim disc of the appropriate thickness is selected and fitted.

Previously, in order to measure the distance between the end of each valve stem and the heel of the associated cam, it has been necessary to install the cam-shaft on the cylinder head of the engine, measure said distance with conventional feeler gauges, remove the cam-shaft from the engine, insert shim disc of the required thickness, and replace the cam-shaft on the cylinder head of the engine. This is a time consuming and therefore expensive operation.

The object of the invention is to provide apparatus for quickly and therefore inexpensively determining the required thickness of shim disc to be inserted between the end of each inlet and exhaust valve stem and its associated cam in an overhead cam-shaft engine.

According to this invention, apparatus for measuring the valve clearance on an overhead cam-shaft internal combustion engine comprises an elongate member provided with two or more bearing surfaces each locatable in an associated cam-shaft bearing of the engine and depth measuring means mounted on the member for measuring the distance between the end of the valve stem and a datum-line or datum surface.

The elongate member preferably has at least one aperture therethrough which is capable of being aligned with the valve stem of the engine and into which aperture the depth measuring means is insertable.

Preferably, each bearing surface on the member comprises at least a part-cylindrical surface which may be formed by the external curved surface of a bearing sleeve slidably mounted thereon.

The depth measuring means, preferably, comprises a block slidably mounted on the elongate member having at least one bore formed therein capable of being aligned with the aperture in the elongate member, and depth measuring apparatus insertable into the bore in the block. The length of the bore in the block from the end thereof adjacent to the valve stem to the pivotal axis of the elongate member in the camshaft bearings of the engine is equal to the radius of a heel portion of a cam on the engine's cam-shaft and the depth measuring apparatus being insertable into the bore in the block for selectively measuring the distance between the end of the bore adjacent to the valve stem and the end of the valve stem. Preferably, also, the depth measuring apparatus is removably secured to the block and may comprise a dial indicator, a micrometer or vernier depth gauge or like apparatus. The elongate member can be circular in cross-section and may be provided with an external longitudinally extending groove in which a projection formed on the block or a detent member mounted on the block is engageable. Preferably, the elongate member is provided with handle means for pivoting the apparatus about the pivotal axis thereof in the cam-shaft bearings of the engine.

A preferred embodiment of this invention will now be described, by way of example only, with reference to the accompanying drawings in which:

FIG. 2 is a section on the line II—II in FIG. 1;

FIG. 3 is a side elevation of a block assembly of the apparatus in a dismantled condition; and FIG. 4 is a perspective view of an alternative block assembly.

Figure 1:
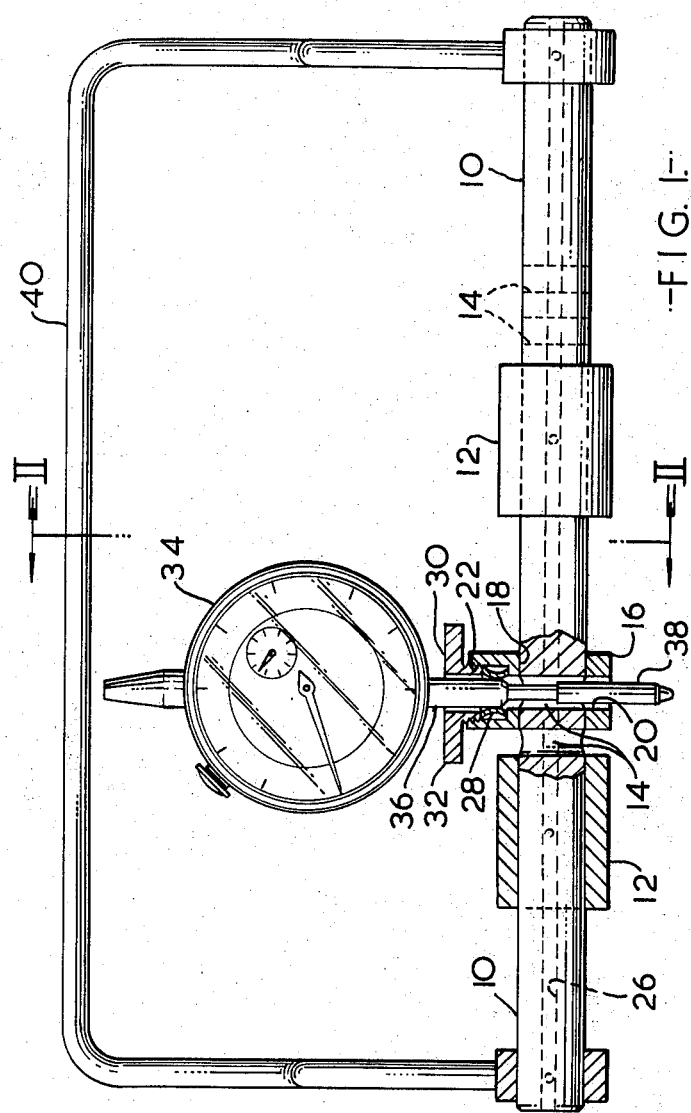
FIG. 1 is a partly sectioned side elevation of a valve clearance measuring apparatus.

A conventional overhead cam-shaft internal combustion engine (not shown) has for example six cylinders and each cylinder has an inlet and an exhaust valve associated therewith. The stem of each valve is surrounded by a valve spring which is confined endwise between the engine's cylinder head and a cup-shaped member, secured adjacent to the end of the valve stem by two collets located in an annular groove in the valve stem in conventional manner. A shim disc is positioned in the cup-shaped member in contact with the end face of the valve stem and is engaged by a nose portion of a cam formed on a cam-shaft, which is rotatably mounted in bearings formed on the engine's cylinder head, causing the valve to be opened against the action of the valve spring.

Referring now to FIGS. 1 to 3 of the drawings, a valve clearance measuring apparatus comprises an elongate cylindrical member 10 having two bearing sleeves 12 slidably mounted thereon. In order to select a shim disc of the required thickness prior to mounting the cam-shaft on the cylinder head of the engine, the apparatus is located in the cam-shaft bearings formed on the engine's cylinder head, the distance between the bearing sleeves 12 being adjusted so that the sleeves 12 seat in the cam-shaft bearings.

The cylindrical member 10 is provided with two pairs of diametrical holes 14, the axial spacing between the holes 14 of one pair being such that each of the holes 14 is aligned with an inlet or exhaust valve stem associated with one cylinder of the engine and the axial spacing between the two pairs of holes 14 being such that the other pair of holes 14 is simultaneously aligned with an inlet or exhaust valve stem associated with another cylinder of the engine adjacent to said one cylinder thereof.

A block 16 having a bore 18 is slidably mounted on the cylindrical member 10 between the two bearing sleeves 12 and is provided with a diametrical bore 20 having an enlarged diameter internally screw-threaded upper portion 22. The block 16 is dimensioned so that the distance between the end of the bore 20 in the lower face of the block and the pivotal axis of the member 10 in the cam-shaft bearing of the engine is equal to the radius of a heel portion of a cam on the engine's cam-shaft. The block 16 has a pin 24 secured therein which projects a short distance radially inwards into the bore 18 and engages a longitudinally extending groove 26 in the cylindrical member 10 to angularly position the block 16 on the member 10 so that the bore 20 may be angularly aligned with one of the holes 14 in the member 10.

A sleeve 28 of a hard NYLON (Trade Mark) material is mounted in the lower end of the portion 22 of the bore 20 and an annular externally screw-threaded locking member 30 having an enlarged diameter knurled upper portion 32 is screwed into the upper end of the portion 22 of the bore 20. A dial indicator 34 having a cylindrical portion 36 in which a reciproachable indicator rod 38 is disposed is slidably mounted on the block 16 with the portion 36 extending through the locking member 30 and the sleeve 28 and the rod 38 extending through the hole 14 and the bore 20 to project beyond the lower face of the block 16. The dial indicator 34 has been initially set to zero when the end of the rod 38 is at the lower end of the bore 20 and the indicator 34 is clamped to the block 16 by screwing the locking member 30 into the bore 20 thereby compressing the sleeve 28 which grips the cylindrical portion 36 of the indicator 34.

The end of the rod 38 projecting beyond the lower face of the block 16 contacts the end face of the one of the valve stems with which the hole 14 is aligned. A handle 40 which extends between and is secured to the ends of the cylindrical member 10, is gripped by an operator and the apparatus is pivoted in the cam-shaft bearings to obtain the minimum reading on the dial indicator 34 with the end of the rod 38 in contact with the end face of the valve stem. This minimum reading gives the distance between the end of the bore 20 (which is equivalent for this purpose, to the heel portion of the cam on the cam-shaft) and the valve stem, and thus the thickness of shim disc required can be accurately and speedily determined for this particular valve. The locking member 30 is unscrewed and the dial indicator withdrawn from the hole 14 in the member 10 and the bore 20 in the block 16, the block 16 is slidably moved along the member 10 to a position in which the bore 20 is aligned with the next one of the diametrical holes 14 in the member 10. The dial indicator 34 is again inserted through the bore 20 in the block 16 and the next hole 14 in the member 10 and the operation repeated for the next one of the valves to determine the thickness of shim disc required.

After repetition of this operation for each valve, the cylindrical member is removed from the cam-shaft bearings, the appropriate thickness shim discs are inserted in the cup-shaped member secured to each one of the valves and the cam-shaft mounted in position.

In a modification, referring now to FIG. 4 of the drawings an alternative block 42 is provided in which the sleeve 28 and the locking member 30 are replaced by a slot 44 extending through the bore 20 and two locking screws 46. When the cylindrical portion 36 of the dial indicator 34 is positioned in the bore 20, the two locking screws 46 are tightened thereby reducing the width of the slot 44 and clamping the portion 36 securely in the bore 20.

It will be realised that the dial indicator can be replaced by other depth measuring apparatus, for example a micrometer depth gauge or vernier depth gauge.

In a further modification, where the apparatus is designed for use on only one particular type of engine, the bearing sleeves 12 are rigidly secured on the member 10 and the block 16 may also be rigidly secured to the member 10 so that the bore 20 is aligned with a single hole 14 formed in the member 10. The bearing sleeves 12 are in this case so positioned in the cam-shaft bearings that this single hole 14 is aligned with the required valve stem.

In yet another modification, where the apparatus is designed for use on one of a number of different types of engine, the block is slidably mounted on the elongate member and is provided with two bores extending at right angles to one another. The block is so dimensioned and the two bores are arranged therein so that the bores are of different lengths and thus the selective location of the depth measuring apparatus in one of the bores enables the apparatus to be used on two different engines in which the heel portions of the cam-shaft associated therewith have different radii.

What I claim is:

1. Apparatus for measuring the valve clearance on an overhead cam-shaft internal combustion engine of the type having cam-shaft bearings and associated valve stems comprising an elongate member provided with at least two bearing surfaces each adapted to be located in an associated cam-shaft bearing of the engine for rockably mounting said apparatus on the engine, said member having at least one aperture therethrough adapted to be aligned with the end of a valve stem when said member is mounted in said bearings; a support for measuring apparatus mounted on the elongate member, said support having at least one bore formed therein adapted to be aligned with the aperture in the elongate member; means providing a datum means on said support; and a measuring device mounted in said support bore and so constructed and arranged as to be operative therethrough for measuring the distance between said end of the valve stem and said datum means.

2. Apparatus according to claim 1, wherein said support is a block slidably mounted on the elongate member for allowing the bore therein to be aligned with an aperture in the elongate member.

3. Apparatus according to claim 1, wherein the length of the bore in said support from the end thereof adjacent the valve stem end to the pivotal axis of the elongate member in said bearings corresponds to the radius of a heel portion of a cam on the engine's cam-shaft, and said measuring device is adapted to measure the distance between said end of the bore and the end of said valve stem.

4. Apparatus according to claim 3, wherein said measuring device comprises a fixed part releasably secured in said bore and a reciprocable valve stem engaging rod connected to an indicator on said part and extending through said bore to contact said valve end.

5. Apparatus according to claim 1, wherein said measuring device is removably secured to said support.

6. Apparatus according to claim 1, wherein said elongate member is circular in cross-section and is provided with an external longitudinally extending groove, and a detent member on said support slidably engageable with said groove for angularly positioning said support on said elongate member.

7. Apparatus according to claim 1, wherein said measuring device comprises a dial indicator having a valve stem engaging rod extending through said bore.

8. Apparatus according to claim 1, wherein each said bearing surface on the member comprises at least a part-cylindrical surface.

9. Apparatus according to claim 1, wherein each said bearing surface is formed by the external curved surface of a bearing sleeve mounted on said elongate member.

10. Apparatus according to claim 9, wherein each said bearing sleeve is slidably mounted on said elongate member.

11. Apparatus according to claim 1, wherein said elongate member is provided with handle means for rocking the apparatus about the pivotal axis thereof in the cam-shaft bearings of the engine.

* * * * *